(12) United States Patent
Milne et al.

(10) Patent No.: US 12,507,052 B2
(45) Date of Patent: Dec. 23, 2025

(54) AUDITORY DEVICE TO AUDITORY DEVICE COMMUNICATION LINKING

(71) Applicant: Sony Group Corporation, Tokyo (JP)

(72) Inventors: James R. Milne, Romona, CA (US); William Clay, San Diego, CA (US); Justin Kenefick, San Diego, CA (US); Gregory Carlsson, Santee, CA (US)

(73) Assignee: SONY GROUP CORPORATION, Tokyo (JP)

( * ) Notice: Subject to any disclaimer, the term of this patent is extended or adjusted under 35 U.S.C. 154(b) by 348 days.

(21) Appl. No.: 18/136,620

(22) Filed: Apr. 19, 2023

(65) Prior Publication Data

US 2024/0357333 A1 Oct. 24, 2024

(51) Int. Cl.
*H04B 7/00* (2006.01)
*G06F 3/16* (2006.01)
*H04W 4/80* (2018.01)
*H04W 76/10* (2018.01)

(52) U.S. Cl.
CPC ............... *H04W 4/80* (2018.02); *G06F 3/16* (2013.01); *H04W 76/10* (2018.02)

(58) Field of Classification Search
CPC ....... H04W 4/80; H04W 76/10; H04W 76/15; H04W 76/14; H04M 1/2477
See application file for complete search history.

(56) References Cited

U.S. PATENT DOCUMENTS 9,510,113 B2 11/2016 Solum
12,069,551 B2 * 8/2024 Liu ...................... H04W 12/50
2013/0018975 A1 * 1/2013 Higgins ................ H04W 12/06
709/208
2017/0026509 A1 1/2017 Rand
2018/0184203 A1 6/2018 Piechowiak
2021/0001132 A1 * 1/2021 Banna ..................... G08C 17/02
2023/0106906 A1 * 4/2023 Bian ..................... H04W 8/005
455/41.2
2024/0038359 A1 * 2/2024 Molesworth .......... A61M 5/172

(Continued)

FOREIGN PATENT DOCUMENTS

EP 1865747 B1 3/2017

OTHER PUBLICATIONS

Srivastava Tanmay et al: "Muteit", Proceedings of the ACM on Interactive, Mobile, Wearable and Ubiquitous Technologies, ACMPUB27, New York, NY, USA, vol. 6, No. 3, Sep. 7, 2022 (Sep. 7, 2022), pp. 1-26, XP059170559, DOI: 10.1145/3550281 the whole document.

(Continued)

*Primary Examiner* — Tuan Pham
(74) *Attorney, Agent, or Firm* — Trellis IP Law Group, PC

(57) ABSTRACT

A computer-implemented method for a first auditory device to connect with a second auditory device that includes determining that a user requests that the first auditory device connect to the second auditory device. The method further includes transmitting a request for a connection to the second auditory device. The method further includes responsive to receiving an acknowledgement, subscribing to the connection. The method further includes communicating with the second auditory device until the first auditory device is done or out of a communication range with the second auditory device.

19 Claims, 9 Drawing Sheets

(56) References Cited

U.S. PATENT DOCUMENTS

2024/0056921 A1\* 2/2024 Zhang ................... H04W 36/03
2024/0272861 A1\* 8/2024 Kim ................... H04N 21/4122

OTHER PUBLICATIONS https://journals.lww.com/thehearingjournal/Fulltext/2010/10000/A_new_method_for_wireless_connectivity_in_hearing.6.aspx Galster, Jason A.; The Hearing Journal 63(10):p. 36,38-39, Oct. 2010.

\* cited by examiner

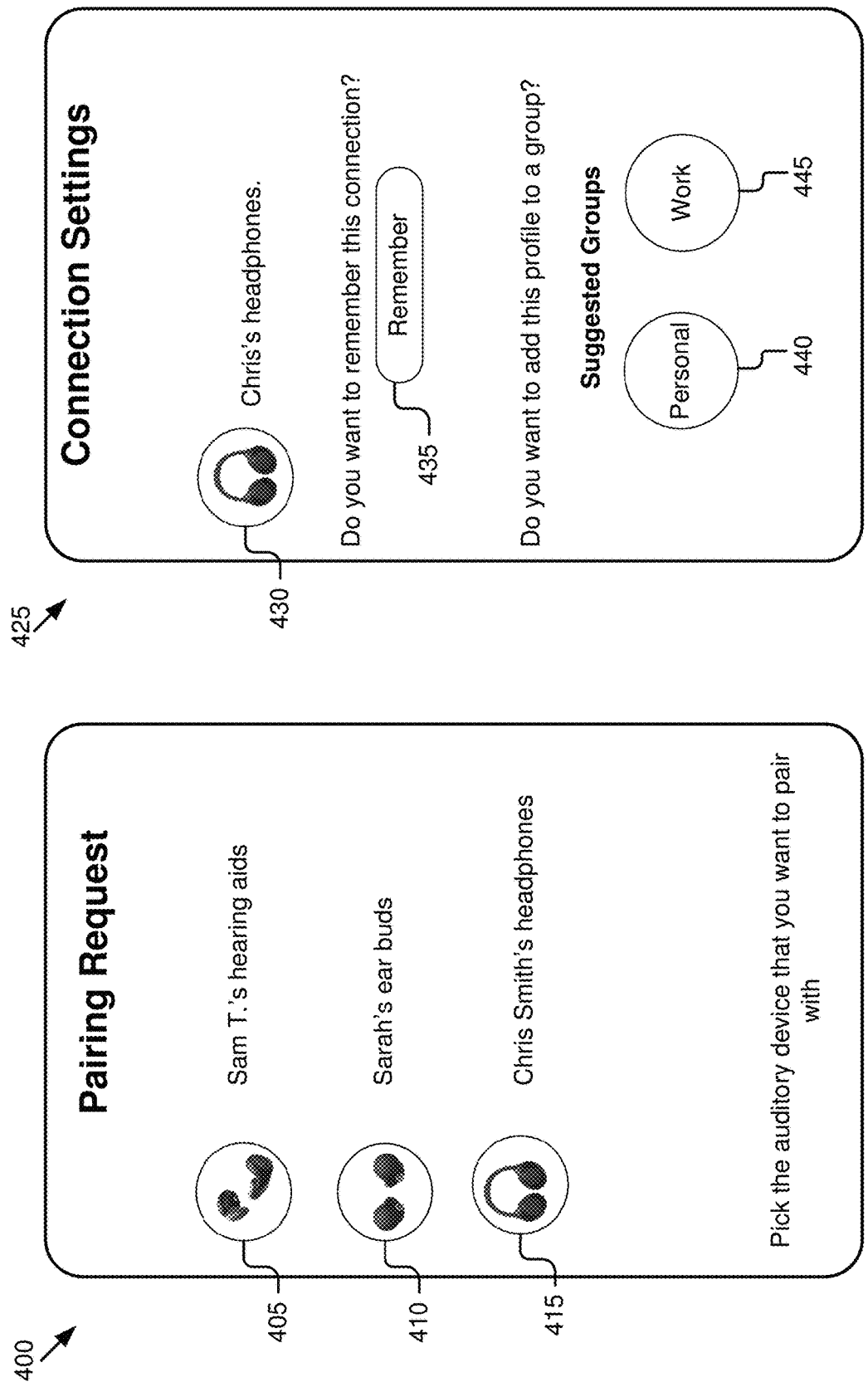

AUDITORY DEVICE TO AUDITORY DEVICE COMMUNICATION LINKING

BACKGROUND

People experience difficulty communicating with each other in noisy environments, even at close range. This issue may be exacerbated when people use hearing aids for communication. Hearing aids have different settings, such as noise cancellation, which may help improve the user's ability to hear, but does not completely fix the problem.

SUMMARY

In some embodiments, a computer-implemented method for a first auditory device to connect with a second auditory device that includes determining that a user requests that the first auditory device connect to the second auditory device. The method further includes transmitting a request for a connection to the second auditory device. The method further includes responsive to receiving an acknowledgement, subscribing to the connection. The method further includes communicating with the second auditory device until the first auditory device is done or out of a communication range with the second auditory device.

In some embodiments, determining that the user requests to connect to the second auditory device includes receiving a request from a user device. In some embodiments, the second auditory device is associated with a first broadcast identifier and the user interface includes the first broadcast identifier as part of a group of identifiers from a personal library, wherein the group of identifiers is at least one selected from the group of a friend group, a family group, a neighbor group, a home internet of things group, and combinations thereof. In some embodiments, the second auditory device is associated with a first broadcast identifier and the user interface includes the first broadcast identifier as part of a group of identifiers from a common library, wherein the group of identifiers is at least one selected from the group of a company group, a work internet of things group, a business group, a public institution group, and combinations thereof.

In some embodiments, the method further includes detecting, with a proximity sensor, a gesture or a tap from the user that corresponds to a request to connect to the second auditory device, where determining that the user requests to connect to the second auditory device is based on detecting the gesture or the tap. In some embodiments, the method further includes detecting, with a voice pick-up sensor, jaw vibrations that correspond to a request to connect to the second auditory device, where determining that the user requests to connect to the second auditory device is based on detecting the jaw vibrations that correspond to the request to connect to the second auditory device. In some embodiments, the acknowledgement is a first acknowledgement and the method further includes receiving a notification that a third auditory device requests a connection with the first auditory device, determining that the user provides permission to connect, and transmit a second acknowledgement to the third auditory device. In some embodiments determining that the user provides permission to connect includes receiving the permission from a user device, a gesture from the user that is detected by a proximity sensor, or jaw vibrations that are detected with a voice pick-up sensor.

In some embodiments, the second auditory device is associated with a first broadcast identifier and the method further includes adding the first broadcast identifier to a database of broadcast identifiers. In some embodiments, the method further includes scanning for broadcast identifiers and transmitting a list of broadcast identifiers that are available to a user device for display, wherein the second auditory device has a broadcast identifier that is part of the list of broadcast identifiers. In some embodiments, the list of broadcast identifiers is based on auditory devices that use one or more settings that are similar to one or more settings for the first auditory device.

In some embodiments, a user device includes one or more processors and logic encoded in one or more non-transitory media for execution by the one or more processors and when executed are operable to: display a user interface that includes an option for a first auditory device to connect to a second auditory device, determine that a user selected the option for the first auditory device to connect to the second auditory device, transmit an instruction to the first auditory device to transmit a request for a connection to the second auditory device, and receive an acknowledgement from the first auditory device that the first auditory device formed a connection with the second auditory device.

In some embodiments, the logic is further operable to generate graphical data for displaying a user interface that includes an option for the first auditory device to associate a name with a broadcast identifier for the first auditory device. In some embodiments, the user interface includes an option for adding a broadcast identifier associated with the second auditory device to groups of identifiers from a personal library, wherein the group of identifiers is at least one selected from the group of a friend group, a family group, a neighbor group, a home internet of things, and combinations thereof. In some embodiments, the user interface includes an option for adding a broadcast identifier associated with the second auditory device to groups of identifiers from a common library, wherein the group of identifiers is at least one selected from the group of a company group, a work internet of things group, a business group, a public institution group, and combinations thereof.

In some embodiments, software is encoded in one or more computer-readable media for execution by the one or more processors on a user device and when executed is operable to: determine that a user requests that the first auditory device connect to the second auditory device, transmit a request for a connection to the second auditory device, responsive to receiving an acknowledgement, subscribe to the connection, and communicate with the second auditory device until the first auditory device is done or out of a communication range with the second auditory device.

In some embodiments, determining that the user requests to connect to the second auditory device includes receiving a request from a user device and the request is made via a user interface that includes an identifier for the second auditory device. In some embodiments, the second auditory device is associated with a first broadcast identifier and the user interface includes the first broadcast identifier as part of a group of identifiers from a personal library, wherein the group of identifiers is at least one selected from the group of a friend group, a family group, a neighbor group, a home internet of things group, and combinations thereof. In some embodiments, the second auditory device is associated with a first broadcast identifier and the user interface includes the first broadcast identifier as part of a group of identifiers from a common library, wherein the group of identifiers is at least one selected from the group of a company group, a work internet of things group, a business group, a public institution group, and combinations thereof. In some embodiments, the computer-readable media is further operable to:

detect, with a proximity sensor, a gesture or a tap from the user that corresponds to a request to connect to the second auditory device, where determining that the user requests to connect to the second auditory device is based on detecting the gesture or the tap.

The technology advantageously creates a connection between two different auditory devices. The connection may be established by sensors in the auditory device instead of a user having to take out a user device and navigate through multiple options to establish the connection. The connection may also be established as part of a group of broadcast identifiers that are listed as being available. The technology may include suggesting different groups of auditory devices that a first auditory device can connect to for different purposes, such as for personal connections or business connections.

A further understanding of the nature and the advantages of particular embodiments disclosed herein may be realized by reference of the remaining portions of the specification and the attached drawings.

BRIEF DESCRIPTION OF THE DRAWINGS

FIG. 4A is an example user interface for making a pairing request according to some embodiments described herein.

FIG. 4B is an example user interface for storing a connection according to some embodiments described herein.

DETAILED DESCRIPTION OF EMBODIMENTS

Figure 1:
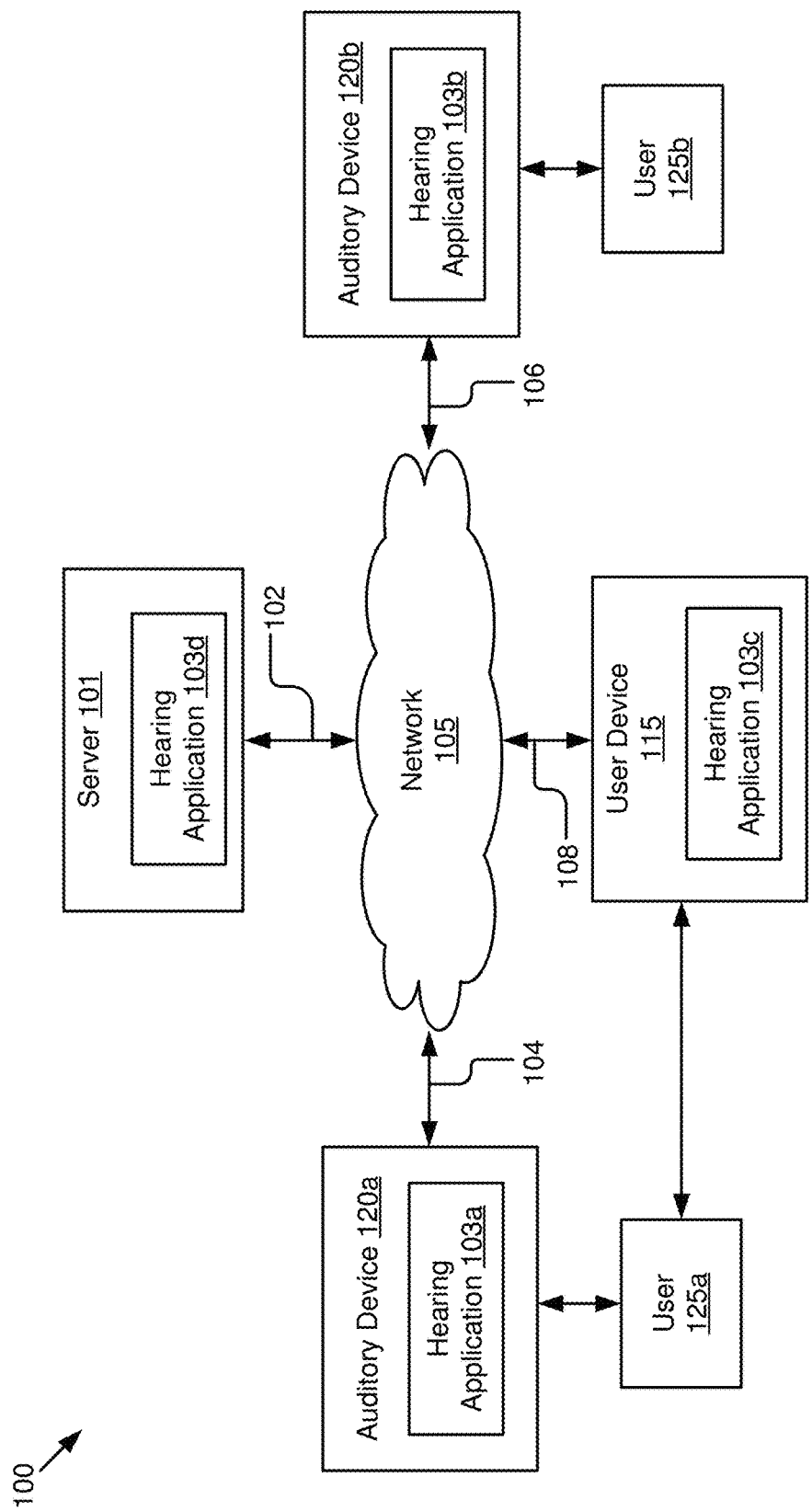
FIG. 1 is a block diagram of an example network environment according to some embodiments described herein.

FIG. 1 illustrates a block diagram of an example environment 100. In some embodiments, the environment 100 includes auditory devices 120, a user device 115, and a server 101. A user 125a may be associated with the user device 115 and a first auditory device 120a and user 125b may be associated with a second auditory device 120b. In FIG. 1 and the remaining figures, a letter after a reference number, e.g., "103a," represents a reference to the element having that particular reference number (e.g., a hearing application 103a stored on the first auditory device 120a). A reference number in the text without a following letter, e.g., "103," represents a general reference to embodiments of the element bearing that reference number (e.g., any hearing application). In some embodiments, the environment 100 may include other servers or devices not shown in FIG. 1. For example, the environment 100 may include additional auditory devices 120.

The auditory device 120 may include a processor, a memory, a speaker, and network communication hardware. The auditory device 120 may be a hearing aid, earbuds, or headphones. The auditory device 120 includes a hearing application 103. For example, the first auditory device 120a includes hearing application 103a and the second auditory device 120b includes hearing application 103b.

The first auditory device 120a is communicatively coupled to the network 105 via signal line 104 and the second auditory device 120b is communicatively coupled to the network 105 via signal line 106. Signal lines 104 and 106 may be a wireless connection, such as Wi-Fi®, Bluetooth®, or other wireless technology.

In some embodiments, the first auditory device 120a includes a hearing application 103a that forms a connection with the second auditory device 120b. For example, the user 125a may request that the first auditory device 120a connect to the second auditory device 120b. The request may be provided to a user interface displayed on a user device 115 or determined from sensor data by the hearing application 103a. The hearing application 103a transmits a request for a connection to the second auditory device 120b. Responsive to the hearing application 103a receiving an acknowledgement from the second auditory device 120b, the hearing application 103a subscribes to the connection. The hearing application 103a communicates with the second auditory device 120b until the first auditory device 120a is done or out of a communication range with the second auditory device 120b.

The user device 115 may be a computing device that includes a memory, a hardware processor, and a hearing application 103c. The user device 115 may include a mobile device, a tablet computer, a laptop, a desktop computer, a mobile telephone, a wearable device, a head-mounted display, a mobile email device, or another electronic device capable of accessing a network 105 to communicate with one or more of the server 101 and the auditory device 120.

In the illustrated implementation, user device 115 is coupled to the network 105 via signal line 108. Signal line 108 may be a wireless connection, such as Wi-Fi®, Bluetooth®, or other wireless technology. The user device 115 is used by way of example. While FIG. 1 illustrates one user device 115, the disclosure applies to a system architecture having one or more user devices 115.

In some embodiments, user device 115 includes a hearing application 103c with code and routines operable to connect with the auditory device 120a to receive a signal, such as by making a connection via Bluetooth® or Wi-Fi®. The hearing application 103c generates graphical data for displaying a user interface with options about making connections with various auditory devices 120. For example, the hearing application 103c may scan an environment 100 for broadcast identifiers and generate a user interface that includes information about a list of broadcast identifiers that are available. In some embodiments, the list of broadcast identifiers are organized into different groups, such as a group of identifiers from a personal library or a group of identifiers from a common library.

The server 101 may include a processor, a memory, and network communication hardware. In some embodiments, the server 101 is a hardware server. The server 101 is communicatively coupled to the network 105 via signal line 102. Signal line 102 may be a wired connection, such as Ethernet, coaxial cable, fiber-optic cable, etc., or a wireless connection, such as Wi-Fi®, Bluetooth®, or other wireless technology.

In some embodiments, the server includes a hearing application 103d. In some embodiments and with user consent, the hearing application 103d on the server 101 maintains a copy of information associated with a user 125, such as the groups of broadcast identifiers created and/or saved by a user 125.

Figure 2:
FIG. 2 is an illustration of example auditory devices according to some embodiments described herein.

FIG. 2 illustrates example auditory devices. Specifically, FIG. 2 illustrates a hearing aid 200, headphones 225, and earbuds 250. In some embodiments, each of the auditory devices is operable to connect with a different auditory device. The auditory devices may be manufactured by Sony or other companies.

Example Computing Device 300

Figure 3:
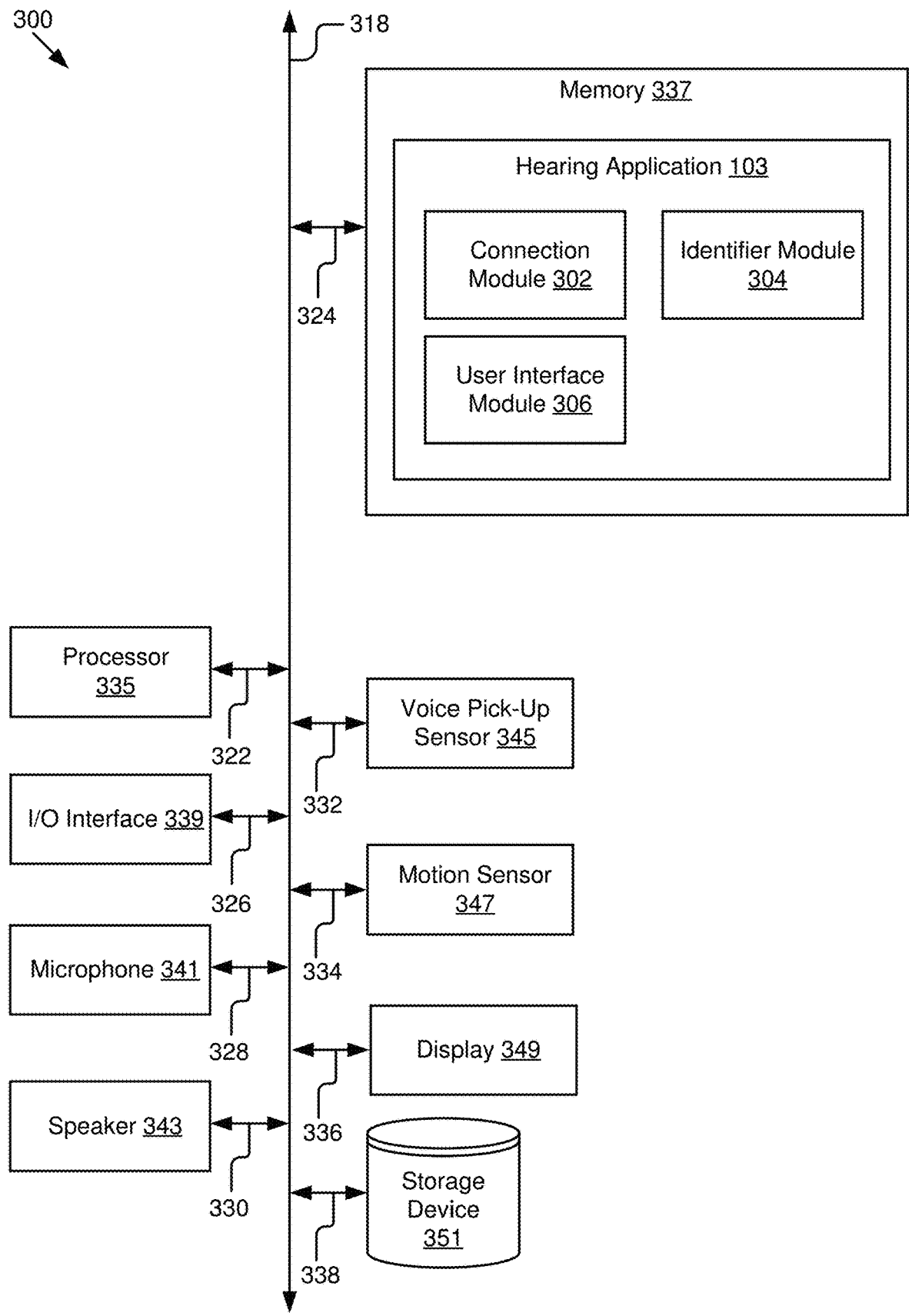
FIG. 3 is a block diagram of an example computing device according to some embodiments described herein.

FIG. 3 is a block diagram of an example computing device 300 that may be used to implement one or more features described herein. The computing device 300 can be any suitable computer system, server, or other electronic or hardware device. In one example, the computing device 300 is the user device 115 illustrated in FIG. 1. In another example, the computing device 300 is the auditory device 120 illustrated in FIG. 1.

In some embodiments, computing device 300 includes a processor 335, a memory 337, an Input/Output (I/O) interface 339, a microphone 341, a speaker 343, a voice pick-up sensor 345, a motion sensor 347, a display 349, and a storage device 351. The processor 335 may be coupled to a bus 318 via signal line 322, the memory 337 may be coupled to the bus 318 via signal line 324, the I/O interface 339 may be coupled to the bus 318 via signal line 326, the microphone 341 may be coupled to the bus 318 via signal line 328, the speaker 343 may be coupled to the bus 318 via signal line 330, the voice pick-up sensor 345 may be coupled to the bus 318 via signal line 332, the motion sensor 347 may be coupled to the bus 318 via signal line 334, the display 349 may be coupled to the bus 318 via signal line 336, and the storage device 351 may be coupled to the bus 318 via signal line 338.

In some embodiments, the components of the computing device 300 may be different depending on whether the computing device 300 is the user device 115 or the auditory device 120 illustrated in FIG. 1. For example, if the computing device 300 is the user device 115 in FIG. 1, the computing device 300 may not include the voice pick-up sensor 345 or the motion sensor 347. If the computing device 300 is the auditory device 120 in FIG. 1, the computing device 300 may not include the display 349.

The processor 335 can be one or more processors and/or processing circuits to execute program code and control basic operations of the computing device 300. A processor includes any suitable hardware system, mechanism or component that processes data, signals or other information. A processor may include a system with a general-purpose central processing unit (CPU) with one or more cores (e.g., in a single-core, dual-core, or multi-core configuration), multiple processing units (e.g., in a multiprocessor configuration), a graphics processing unit (GPU), a field-programmable gate array (FPGA), an application-specific integrated circuit (ASIC), a complex programmable logic device (CPLD), dedicated circuitry for achieving functionality, or other systems. A computer may be any processor in communication with a memory.

The memory 337 is typically provided in computing device 300 for access by the processor 335 and may be any suitable processor-readable storage medium, such as random access memory (RAM), read-only memory (ROM), Electrical Erasable Read-only Memory (EEPROM), Flash memory, etc., suitable for storing instructions for execution by the processor or sets of processors, and located separate from processor 335 and/or integrated therewith. Memory 337 can store software operating on the computing device 300 by the processor 335, including the hearing application 103.

The I/O interface 339 can provide functions to enable interfacing the computing device 300 with other systems and devices. Interfaced devices can be included as part of the computing device 300 or can be separate and communicate with the computing device 300. For example, network communication devices, storage devices (e.g., the memory 337 or the storage device 351), and input/output devices can communicate via I/O interface 339. In some embodiments, the I/O interface 339 can connect to interface devices such as input devices (keyboard, pointing device, touchscreen, microphone, sensors, etc.) and/or output devices (display 349, speakers, etc.).

In some embodiments, the I/O interface 339 implements a Bluetooth or Wi-Fi protocol for processing, transmitting, and receiving wireless signals. For example, the wireless protocol may be Bluetooth, Bluetooth 5.0, Bluetooth 5.1, Bluetooth 5.2 (i.e., Bluetooth Classic), Bluetooth 5.3, Bluetooth LE, Bluetooth LE Audio, Wi-Fi, and/or a proprietary standard created by the manufacturer of the auditory device.

The microphone 341 includes hardware for detecting sounds. For example, the microphone 341 may detect ambient noises, people speaking, music, etc. The microphone 341 converts the detected sounds to an electrical signal that is transmitted to the speaker 343 via the I/O interface 339. In some embodiments, the microphone 341 includes different settings, such as far-field detection and near-field detection.

The speaker 343 includes hardware for receiving the electrical signal from the microphone 341 and converts the electrical signal into sound waves that are output for the user to hear. For example, the speaker 343 may include a digital to analog converter that converts the electrical signal to sound waves. In some embodiments, the speaker 343 also includes an amplifier that is used to amplify, reduce, or block certain sounds based on a particular setting. For example, the amplifier may block ambient noise when a noise cancelling setting is activated.

The voice pick-up sensor 345 includes hardware for detecting jaw vibrations due to speech. The voice pick-up sensor 345 relies on bone conduction to detect jaw vibrations created by speaking.

The motion sensor 347 includes hardware for detecting a gesture or a tap from the user. In some embodiments, the motion sensor is a proximity sensor that identifies particular gestures made by the user's hand that are associated with particular instructions. In some embodiments, the motion sensor detects when the user makes contact with the auditory device. For example, the user may tap the auditory device or press a button on the auditory device.

The display 349 may connect to the I/O interface 339 to display content, e.g., a user interface, and to receive touch (or gesture) input from a user. The display 349 can include any suitable display device such as a liquid crystal display (LCD), light emitting diode (LED), or plasma display screen, cathode ray tube (CRT), television, monitor, touchscreen, or other visual display device.

The storage device 351 stores data related to the hearing application 103. For example, the storage device 351 may store groups of broadcast identifiers defined by the user, groups of broadcast identifiers generated for the hearing application 103, etc.

Although particular components of the computing device 300 are illustrated, other components may be added or removed.

Example Hearing Application 103

In some embodiments, the hearing application 103 includes a connection module 302, an identifier module 304, and a user interface module 306.

The connection module 302 scans for broadcast identifiers and identifies auditory devices that are within a communication range of the first auditory device. For example, if the communication protocol is Bluetooth, the communication range may be less than 30 feet. If the communication protocol is Wi-Fi, the communication range may be less than 160 feet. In some embodiments, the connection module 302 scans for broadcast identifiers that use one or more settings that are similar to the one or more settings for the first auditory device. For example, the connection module 302 may identify broadcast identifiers for devices that have active noise cancellation (or a special anti-noise setting) enabled because the first auditory device has active noise cancellation enabled.

In some embodiments, the connection module 302 provides information about the broadcast identifiers to the user interface module 306. The user interface module 306 may display the list of broadcast identifiers that are available. In some embodiments, the list of broadcast identifiers is based on the one or more settings, such as first listing corresponding auditory devices that have the same or similar settings as the first auditory device. In some embodiments, a user requests to make a connection with a particular auditory device through the user interface for the first time that the connection module 302. For example, the user may see a second auditory device and request that the connection module 302 make a connection or the user interface may include a list of broadcast identifiers that are available.

Once the connection module 302 determines that the user requests to connect with a second auditory device, the connection module 302 transmits a request to connect via the I/O interface 339 to the second auditory device. The connection may be a Bluetooth connection, a Wi-Fi connection, a proprietary connection produced by the manufacturer of the auditory device, or another type of wireless connection. In some embodiments, if the connection is an older Bluetooth connection, such as Bluetooth 5.0, the first auditory device may stop communicating with the user device and instead try to form a connection with the second auditory device. Alternatively, the auditory device may reserve different time slots in order to maintain multiple connections using the Bluetooth protocol. If the connection is Bluetooth LE Audio or Wi-Fi, the first auditory device may maintain multiple connections.

The connection module 302 determines if an acknowledgement is received from the second auditory device. If the acknowledgement is not received (e.g., if the acknowledgement is not received within a predetermined amount of time), the connection module 302 may halt the connection and go back to scanning for broadcast identifiers. If the connection module 302 receives the acknowledgement, the connection module 302 may subscribe to the connection. In some embodiments, the connection module 302 maintains an encrypted connection. The encrypted connection may turn off when more than two people are part of the connection.

The connection module 302 determines whether to store the connection. For example, the user interface module 306 may generate graphical data for displaying a user interface that asks the user if they want to store the connection. The connection module 302 either stores the connection and starts the communication or, if the connection is not being stored, starts the communication. The connection is used by the first auditory device to communicate directly with the second auditory device. For example, the user may speak and the sounds are detected by the microphone 341 and/or the voice pick-up sensor 345. The sounds are transmitted via the I/O interface 339 to the second auditory device, which uses a speaker to emit the sounds directly to the user of the second auditory device. As a result, a noisy environment has less of an effect on the ability of the users to hear because their communications are transmitted to the auditory devices.

The connection module 302 may maintain the connection until the user is done (e.g., the user indicates that the connection should be stopped) or the second auditory device is out of range.

For subsequent connections, the connection module 302 may receive a request about the user wanting to connect with the particular auditory device using other indicators. For example, the computing device 300 may include a voice pick-up sensor 345 that identifies jaw vibrations or the microphone 341 detects user instructions from the user to connect with the particular auditory device. The connection module 302 may determine, based on information from the voice pick-up sensor 345, that the user indicated a desire to connect and an identity for the connection. For example, the user may say "connect with Sam's device" and the connection module 302 identifies Sam's device from the list of broadcast identifiers that are available.

In another example, the computing device 300 may include a motion sensor 347 (or more specifically, a proximity sensor) that detects gestures or a tap from the user that indicates that the user wants to connect with the particular auditory device. For example, the user may make a gesture that represents a request to make a connection. The gesture may include a particular hand motion or simply a sequence of hand movements into and out of the proximity of the motion sensor 347 within a predetermined amount of time (e.g., three movements within proximity of the motion sensor 347 within five seconds). The motion sensor 347 may transmit the details of the gesture to the connection module 302, which interprets the intent of the user. The gesture may be further refined to be determined to be directed to a particular person. For example, the connection module 302 may determine that the gesture refers to a person directly in front of the user instead of a person off to the side.

In another example, the motion sensor 347 may provide information about a tap to the connection module 302. In some embodiments, the connection module 302 provides instructions to the speaker 343 to further discern the user's intent. For example, the user may tap once to indicate a desire to connect with a particular auditory device. The connection module 302 may instruct the speaker to provide the user with the list of broadcast identifiers that are available (e.g., "the available broadcast identifiers include Sam's hearing aids, Sarah's ear buds, and Chris's headphones."). The user may then provide two taps after hearing the broadcast identifier for the particular auditory device that the user wants to connect with. As a result, the user is able to connect with the particular auditory device without having to go through a cumbersome process of identifying the particular auditory device through a user interface on a user device.

In some embodiments, instead of the user indicating that they want to connect with the second auditory device, the connection module 302 automatically connects with the second auditory device once the second auditory device is less than a predetermined threshold distance from the first auditory device. The predetermined threshold distance may be the same as a communication range or different measure, such as a distance generally accepted as a distance when two people would hold a conversation (e.g., five feet or less). In some embodiments, if a first auditory device is connected to a second auditory device, the first auditory device automatically connects to a third auditory device if the third auditory device is part of the same group as the second auditory device.

In some embodiments, the voice pick-up sensor 345 or the motion sensor 347 may be used for accepting requests from other auditory devices to connect with the first auditory device. The connection module 302 may receive a notification that a third auditory device requests a connection with the first auditory device and determines that the user provides permission to connect. For example, the speaker 343 may ask if the user wants to connect with the third auditory device as identified with the broadcast identifier, the voice pick-up sensor 345 may determine that the user speaks a confirmation or rejection ("yes," "deny request," etc.) or the motion sensor 347 may detect that the user's hand is within proximity or provided one or two taps to convey confirmation or rejection. If the user provides permission to connect, the connection module 302 may transmit, via the I/O interface 339, an acknowledgement to the third auditory device.

The identifier module 304 maintains lists of broadcast identifiers. In some embodiments, the identifier module 304 creates groups of identifiers from a personal library or a common library. The identifier module 304 may create the personal library from the user's contacts (responsive to the user providing permission to access their contacts), from instructions provided by the user (e.g., the user asks to save particular auditory devices to one or more groups), etc.

The personal library may include a friend group, a family group, a neighbor group, and/or a home internet of things (IoT) group. The home IoT group may include broadcast identifiers for devices in the user's home based on the Media Access Control (MAC) addresses for the devices, such as a thermostat, a search assistant, a security system, etc. The user may want to connect to a device in the home IoT group, such as an air conditioner, to provide instructions for modifying the settings.

The identifier module 304 may create the common library from predefined groups. The common library may include a company group (e.g., employees of a company that the user is associated with, people that are attending the same work conference, etc.), a work IoT group (e.g., in case the user wants to change the thermostat at work), a business group (e.g., so the user can speak with employees of a business), and/or a public institution group (e.g., the user might want to speak with a librarian at a busy library).

In some embodiments, once a broadcast identifier is saved to the user's profile, the user may be able to use voice recognition and the broadcast identifier to request a connection. For example, the identifier module 304 may receive audio from the user via the microphone 341 and/or the voice pick-up sensor 345 that identifies a second auditory device based on the broadcast identifier. The connection module 302 may connect to the second auditory device based on the user's request.

In some embodiments, the identifier module 304 may communicate with the connection module 302 to dynamically add and subtract members to a group and conversation. For example, if the user is at a conference, the identifier module 304 may provide the communication module 302 with information about different groups. If the user is already connected with an auditory device associated with a different group, the connection module 302 may automatically add additional auditory devices that are associated with the same group. In some embodiments, the groups may be created for the purpose of a particular event. For example, the conference may have different discussion sessions and a group is defined as all the participants that signed up for a particular discussion session.

In some embodiments, the identifier module 304 suggests different groups based on the user's location. For example, if first auditory device enters a public building, such as a school, the identifier module 304 may suggest a public institution group, such as a group of auditory devices in the school that the user can contact for help.

In some embodiments, the identifier module 304 uses a trained machine-learning model to output different groups. In some embodiments, the machine-learning model may be trained using a training set that includes behavior data for different users. For example, users may typically create a family group that includes people that live with the user and/or close family members, a work group, and an IoT group. The machine-learning model may output suggested groups that are similar to the training set, such as suggesting a family group, a work group, and an IoT group.

In another example, users may historically automatically add people to conversations that are part of the family group once the broadcast identifiers for people in the family group are within communication range. Conversely, for users in a work group, a user may not automatically add other users in the work group to the conversation because the conversation may be heavily dependent on the type of conversation. As a result, the trained machine-learning model may automatically add people to conversations for family groups, but not for work groups.

In some embodiments, a user downloads the hearing application 103 onto a computing device 300. The user interface module 306 may generate graphical data for displaying a user interface where the user provides input that the user interface module 306 uses to generate a profile for the user. For example, the user may provide a username and password, input their name, and provide an identification of an auditory device (e.g., identify whether the auditory device is a hearing aid, headphones, or earbuds).

In some embodiments, the user interface includes an option for specifying a particular type of auditory device and a particular model that is associated with the user. For example, the hearing aids may be Sony C10 self-fitting over-the-counter hearing aids (model CRE-C10) or E10 self-fitting over-the-counter hearing aids (model CRE-E10). The identification of the type of auditory device is used for, among other things, determining how to configure sounds. For example, an inner-ear hearing aid will generate quieter sounds than over-the-ear headphones. In some embodiments, the user interface may include an option for the first auditory device to associate a name with a broadcast identifier for the first auditor device. For example, the user interface may include information about the type of auditory device and the user's name, but the user may have the option of configuring the suggested name.

The user interface module 306 may generate graphical data for displaying a user interface that enables a user to make a connection between the computing device 300 and the auditory device. For example, the auditory device may be Bluetooth enabled and the user interface module 306 may generate graphical data for instructing the user to put the auditory device in pairing mode. The computing device 300 may receive a signal from the auditory device via the I/O interface 339 and the user interface module 306 may generate graphical data for displaying a user interface that guides the user to select the auditory device from a list of available devices.

The user interface module 306 may generate graphical data for displaying a user interface that enables a user to make a connection with another auditory device. FIG. 4A is an example user interface 400 for making a pairing request. In some embodiments, the user interface module 306 generates the user interface 400 after the connection module 302 scans for broadcast identifiers and provides the user interface module 306 with the list of broadcast identifiers that are available.

In this example, each of the auditory devices 405, 410, 415 were configured by respective users to include the user's preferred description. The first auditory device 405 is described as "Sam T.'s hearing aids," the second auditory device 410 is described as "Sara's ear buds," and the third auditory device 415 is described as "Chris Smith's headphones." The user may request to connect with one of the auditory devices by selecting the corresponding auditory device 405, 410, 415.

Once the user makes a connection with an auditory device, in some embodiments, the user interface module 306 generates graphical data for displaying a user interface that asks whether the user wants to save the connection. The user interface module 306 may generate the user interface as soon the first auditory device makes a connection with the second auditory device, after the connection is concluded, or other variations.

FIG. 4B is an example user interface 425 for storing a connection according to some embodiments described herein. In this example, the user interface 425 includes an identification 430 of the second auditory device that the first auditory device was connected to, a question about whether the user wants to remember the profile with a remember button 435 that the user can select to remember the connection, and a question about whether the user wants to remember the connection as part of a group.

In some embodiments, the identifier module 304 generates suggested groups for the user to save the connection to. For example, the identifier module 304 may generate a suggestion that the user save the connection to a personal group by clicking on the personal button 440. The identifier module 304 may receive location information and determine the suggestions based on the location. For example, the identifier module 304 may determine based on the location that the user is at work and, as a result, the identifier module 304 suggests that the user save the connection to the work group by clicking on the work button 445.

Figure 4D:
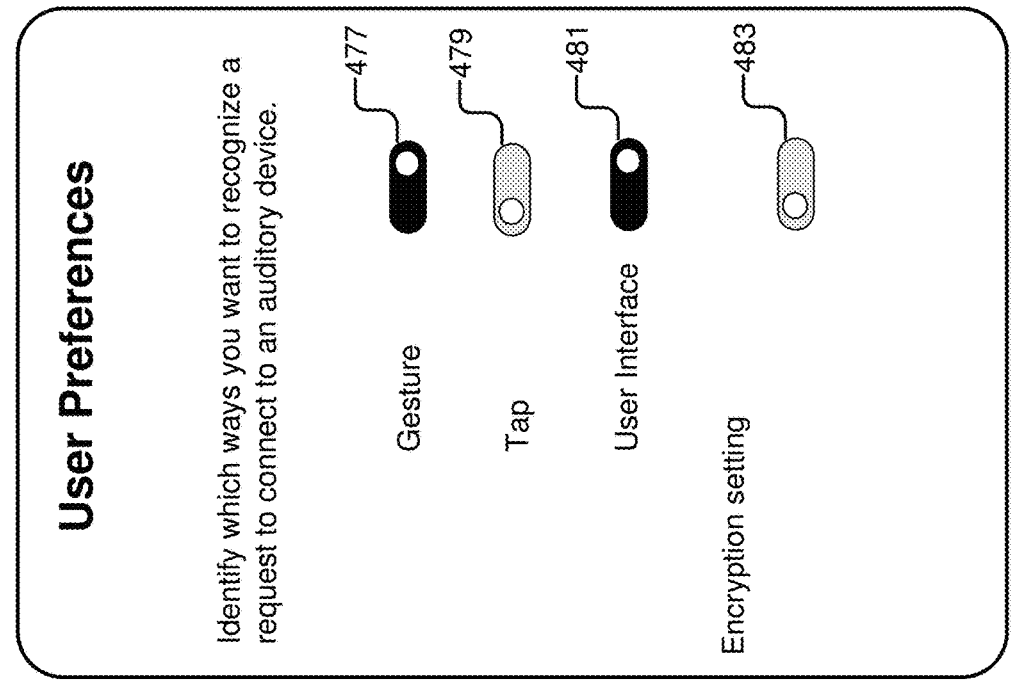
FIG. 4D is an example user interface for providing user preferences according to some embodiments described herein.
Figure 4C:
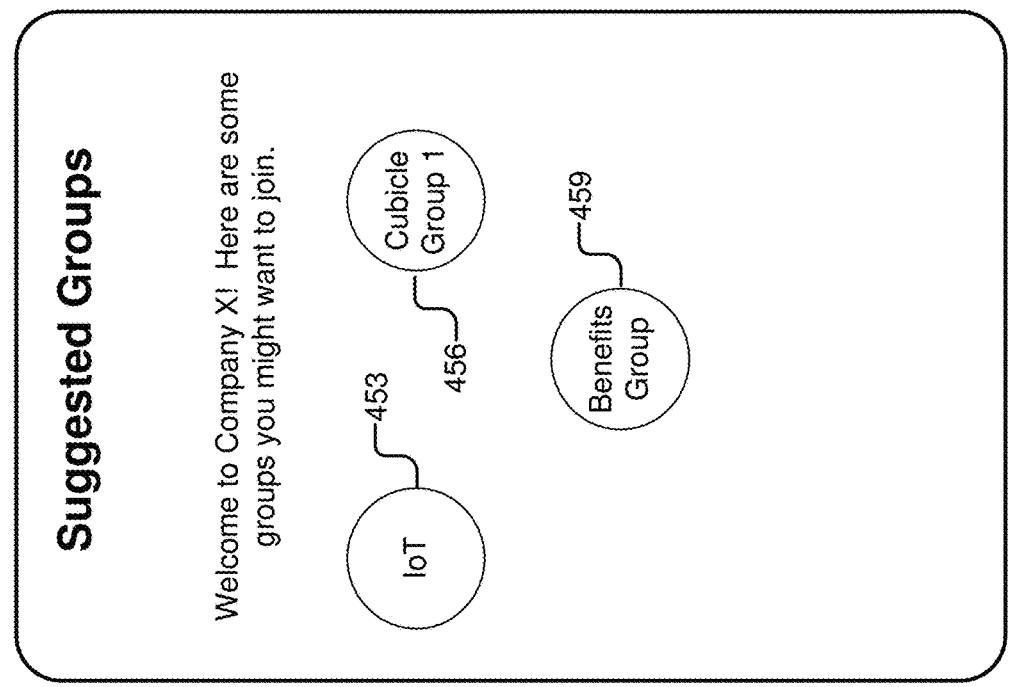
FIG. 4C is an example user interface for defining groups of broadcast identifiers according to some embodiments described herein.

In some embodiments, the user interface module 306 generates graphical data for displaying a user interface suggested groups for the user based on a triggering event, such as when the user enters a new location. FIG. 4C is an example user interface 450 for defining groups of broadcast identifiers. In this example, the user may be starting a new job at Company X and the user interface module 306 generates a list of suggested groups for the user. In this example, the suggested groups include an IoT button 453 for joining a group of IoT devices at work (e.g., so the user can provide instructions to a printer), a cubicle group 1 button 456 because the user is associated to sit in the group 1 cubicles that may be helpful for the user to communicate with employees in the same group, and a benefits group button 459 because the user is on the benefits committee and may want to communicate with other members of the benefit of group using auditory devices.

In some embodiments, the user interface module 306 generates graphical data for displaying a user interface for determining user preferences. FIG. 4D is an example user interface 475 for providing user preferences. In this example, the user preferences include a section on how the user would prefer the connection module 302 to recognize a request to connect to an auditory device. Specifically, the gesture radio button 477 is activated, the tap radio button 479 is deactivated, and the user interface radio button 481 is activated. As a result of the settings, the user may request to connect to an auditory device by making a particular gesture or selecting a broadcast identifier on a user interface, but a tap will not be interpreted as a request to connect to the auditory device.

The user interface 475 also includes an encryption setting that includes an encryption radio button 483 where the user has turned off encryption such that the communications won't be encrypted.

Example Methods

Figure 5:
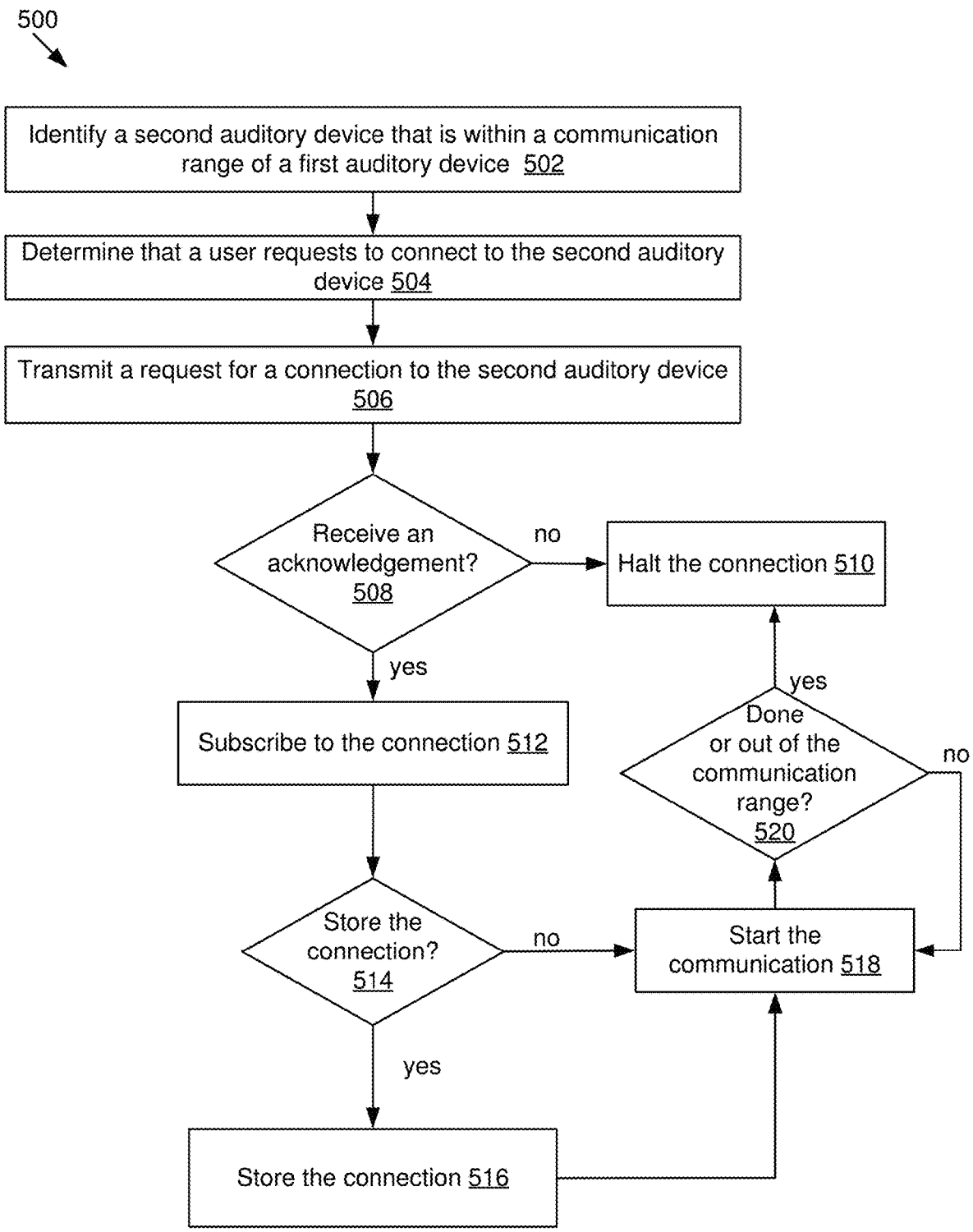
FIG. 5 is an illustration of flowchart of an example method for a first auditory device to make a connection with a second auditory device according to some embodiments described herein.

FIG. 5 is an illustration of flowchart of an example method 500 for a first auditory device to make a connection with a second auditory device. The method 500 may be performed by the computing device 300 in FIG. 3. For example, the computing device 300 may be the auditory device 120 illustrated in FIG. 1. The computing device 300 includes a hearing application 103 that implements the steps described below.

The method 500 may begin with block 502. At block 502, a second auditory device that is within a communication range of a first auditory device is identified. In some embodiments, a user identifies the second auditory device or the hearing application 103 identifies the second auditory device as being within communication range. Block 502 may be followed by block 504.

At block 504, is it determined that a user requests to connect to the second auditory device. For example, the user may select a broadcast identifier associated with the second auditory device from a list of broadcast identifiers in a user interface. Block 504 may be followed by block 506.

At block 506, a request for a connection is transmitted to the second auditory device. For example, the request may be transmitted using a Bluetooth protocol, via Wi-Fi, or via a proprietary protocol. Block 506 may be followed by block 508.

At block 508, it is determined whether an acknowledgement was received. If the acknowledgement was not received, block 508 may be followed by block 510. At block 510, the connection is halted. For example, if the request for a connection is transmitted via Bluetooth LE Audio, and the second auditory device does not respond within a predetermined amount of time, the hearing application 103 may discard the packets with the request. If the request for a connection is transmitted via other Bluetooth protocols, the packets ma be resent until successful for the connect is halted.

If the acknowledgment was received, block 508 may be followed by block 512. At block 512, the connection is subscribed to. Block 512 may be followed by block 514.

At block 514, it is determined whether to store the connection. For example, the hearing application 103 may generate graphical data for displaying a user interface that asks the user if the user wants to store the connection. If it is determined that the connection is to be stored, block 514 may be followed by block 516. At block 516, the connection is stored. Block 516 may be followed by block 518.

If it is determined that the connection is not to be stored, block 514 may be followed by block 518. At block 518, the communication is started. Block 518 may be followed by block 520.

At block 520 it is determined whether the communication is done or one of the auditory devices is out of the communication range. If the communication is not done and the auditory devices are within the communication range, block 520 may be followed by block 518 and the process repeats until either the communication is done or one of the auditory devices is out of the communication range, at which point block 520 may be followed by block 510.

Figure 6:
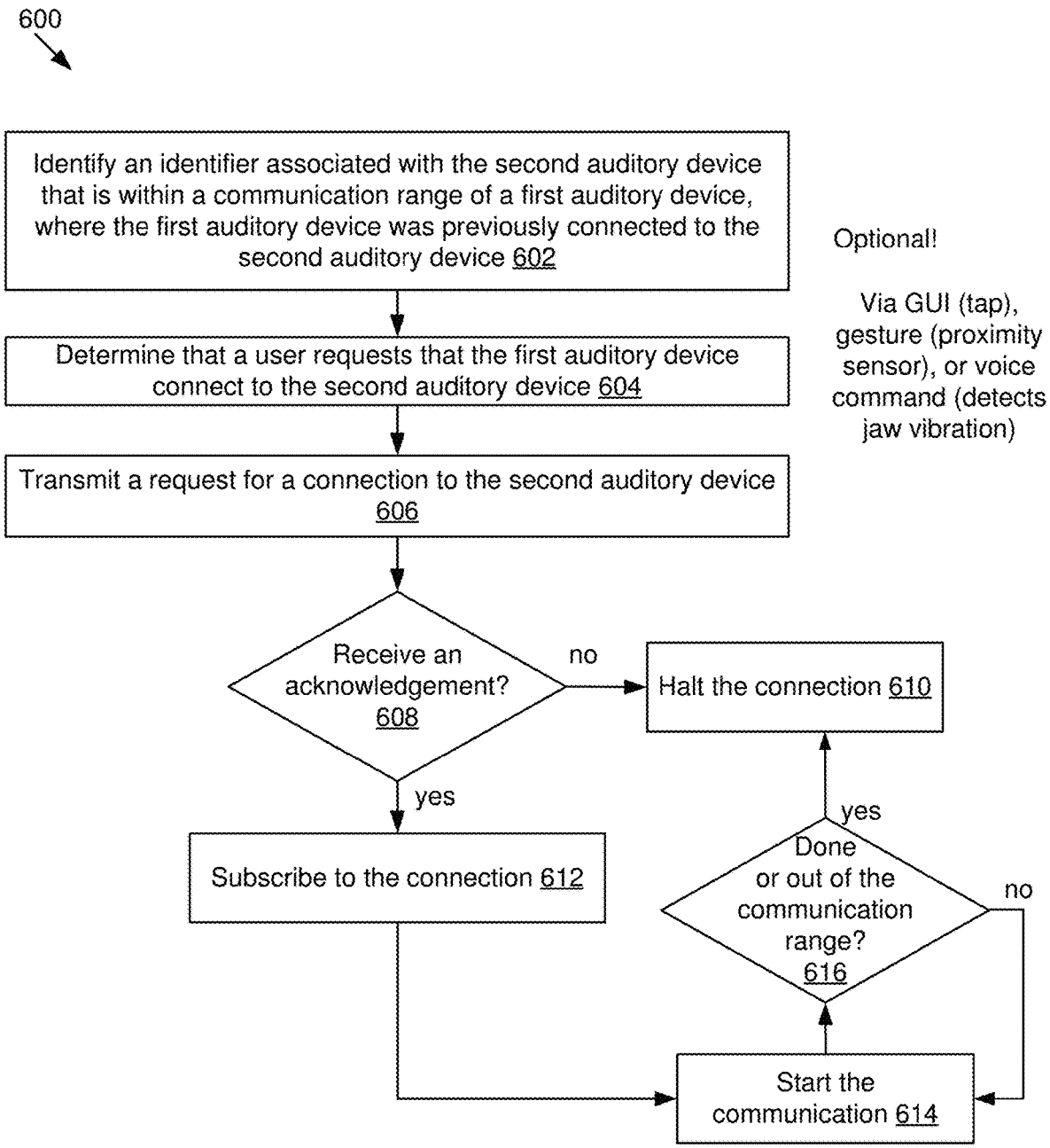
FIG. 6 illustrates a flowchart of an example method for a first auditory device to make a subsequent connection with the second auditory device according to some embodiments described herein.

FIG. 6 illustrates a flowchart of an example method 600 for a first auditory device to make a subsequent connection with the second auditory device. The method 600 may be performed by the computing device 300 in FIG. 3. For example, the computing device 300 may be the auditory device 120 illustrated in FIG. 1. The computing device 300 includes a hearing application 103 that implements the steps described below.

The method 600 may begin with block 602. At block 602, an identifier associated with the second auditory device that is within a communication range of the first auditory device is identified. Block 602 may be followed by block 604.

At block 604, it is determined that a user requests that the first auditory device connect to the second auditory device. For example, the user may select a broadcast identifier associated with the second auditory device from a user interface, perform a gesture detected by a motion sensor, or speak instructions that are detected by a microphone and/or a voice pick-up sensor to connect with the second auditory device. Block 604 may be followed by block 606.

At block 606, a request for a connection to the second auditory device is transmitted. Block 606 may be followed by block 608.

At block 608 it is determined whether an acknowledgement was received. If the acknowledgement was not received, block 608 may be followed by block 610. At block 610, the connection is halted.

If the acknowledgement was received, block 608 may be followed by block 612. At block 612, the connection is subscribed to. Block 612 may be followed by block 614.

At block 614, the communication is started. Block 614 may be followed by block 616.

At block 616, it is determined whether the communication is done or one of the auditory devices is out of the communication range. If the communication is not done and the auditory devices are within the communication range, block 616 may be followed by block 614 and the process repeats until either the communication is done or one of the auditory devices is out of the communication range, at which point block 616 may be followed by block 610.

Figure 7:
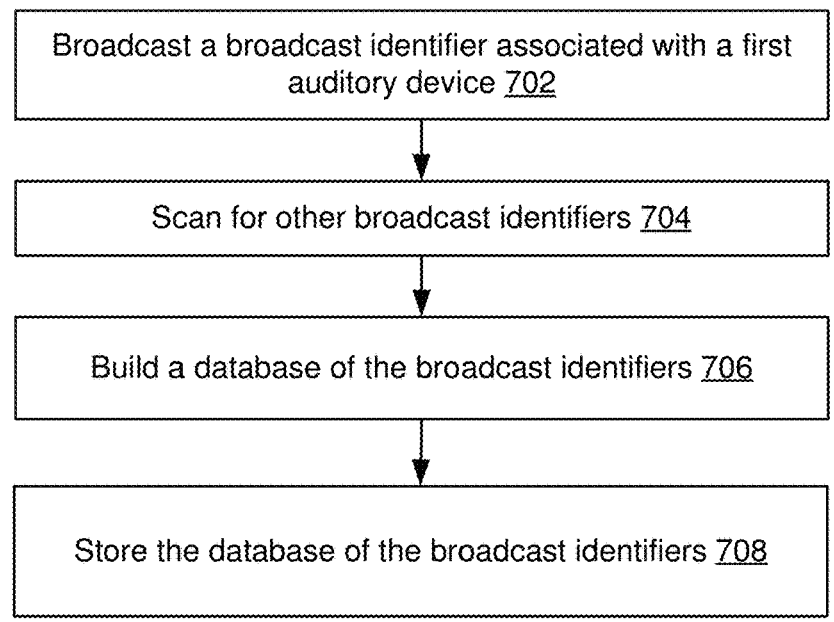
FIG. 7 illustrates a flowchart of an example method to store a database of broadcast identifiers according to some embodiments described herein.

FIG. 7 illustrates a flowchart of an example method to store a database of broadcast identifiers. The method 700 may be performed by the computing device 300 in FIG. 3. For example, the computing device 300 may be the auditory device 120 illustrated in FIG. 1. The computing device 300 includes a hearing application 103 that implements the steps described below.

The method 700 may begin with block 702. At block 702, a broadcast identifier associated with the first auditory device is broadcast. Block 702 may be followed by block 704.

At block 704, other broadcast identifiers are scanned for. Block 704 may be followed by block 706.

At block 706, a database of the broadcast identifiers is built. Block 706 may be followed by block 708.

At block 708, the database of the broadcast identifiers is stored. In some embodiments, the hearing application 103 suggests some of the broadcast identifiers to the user. For example, if any of the broadcast identifiers become within communication range of the first auditory device, the hearing application 103 may suggest the corresponding broadcast identifiers.

Figure 8:
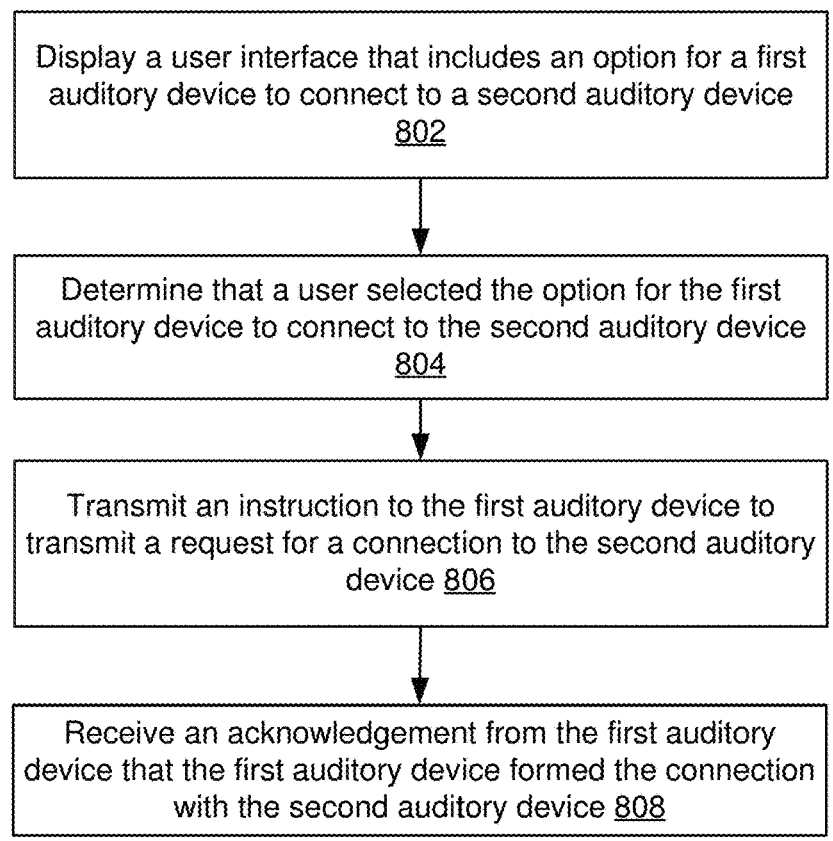
FIG. 8 illustrates a flowchart of an example method for a user device to manage a connection between a first auditory device and a second auditory device according to some embodiments described herein.

FIG. 8 illustrates a flowchart of an example method for a user device to manage a connection between a first auditory device and a second auditory device. The method 800 may be performed by the computing device 300 in FIG. 3. For example, the computing device 300 may be the user device 115 illustrated in FIG. 1. The computing device 300 includes a hearing application 103 that implements the steps described below.

The method 800 may begin with block 802. At block 802, a user interface is displayed that includes an option for a first auditory device to connect to a second auditory device. The first auditory device is associated with the user device that implements the method 800. Block 802 may be followed by block 804.

At block 804, it is determined that a user selected the option for the first auditory device to connect to the second auditory device. Block 804 may be followed by block 806.

At block 806, an instruction is transmitted to the first auditory device to transmit a request for a connection to the second auditory device. Block 806 may be followed by block 808.

At block 808, an acknowledgement is received from the first auditory device that the first auditory device formed the connection with the second auditory device. In some embodiments, the user interface includes an option for adding a broadcast identifier to groups of identifiers from a personal library or a common library. The personal library may include a friend group, a family group, a neighbor group, and/or a home IoT. The common library may include a company group, a work internet of things group, a business group, and/or a public institution group.

Although the description has been described with respect to particular embodiments thereof, these particular embodiments are merely illustrative, and not restrictive.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other non-transitory media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A computer-implemented method for a first auditory device to connect with other auditory devices, the method comprising:
    determining that a user requests that the first auditory device connect to a second auditory device;
    transmitting a request for a first connection to the second auditory device;
    responsive to receiving a first acknowledgement, subscribing to the first connection;
    receiving a notification that a third auditory device requests a second connection with the first auditory device;
    determining that the user provides permission to connect to the third auditory device;
    transmit a second acknowledgement to the third auditory device; and
    communicating, by the first auditory device, with the second auditory device until the first auditory device is done or out of a communication range with the second auditory device.

2. The method of claim 1, wherein:
    determining that the user requests to connect to the second auditory device includes receiving a request from a user device; and
    the request is made via a user interface that includes an identifier for the second auditory device.

3. The method of claim 2, wherein the second auditory device is associated with a first broadcast identifier and the user interface includes the first broadcast identifier as part of a group of identifiers from a personal library, wherein the group of identifiers is at least one selected from the group of a friend group, a family group, a neighbor group, a home internet of things group, and combinations thereof.

4. The method of claim 2, wherein the second auditory device is associated with a first broadcast identifier and the user interface includes the first broadcast identifier as part of a group of identifiers from a common library, wherein the group of identifiers is at least one selected from the group of a company group, a work internet of things group, a business group, a public institution group, and combinations thereof.

5. The method of claim 1, further comprising:
    detecting, with a proximity sensor, a gesture or a tap from the user that corresponds to a request to connect to the second auditory device; and
    wherein determining that the user requests to connect to the second auditory device is based on detecting the gesture or the tap.

6. The method of claim 1, further comprising:
    detecting, with a voice pick-up sensor, jaw vibrations that correspond to a request to connect to the second auditory device; and
    wherein determining that the user requests to connect to the second auditory device is based on detecting the jaw vibrations that correspond to the request to connect to the second auditory device.

7. The method of claim 1, wherein determining that the user provides permission to connect includes receiving the permission from a user device, a gesture from the user that is detected by a proximity sensor, or jaw vibrations that are detected with a voice pick-up sensor.

8. The method of claim 1, wherein the second auditory device is associated with a first broadcast identifier and further comprising:
    adding the first broadcast identifier to a database of broadcast identifiers.

9. The method of claim 1, further comprising:
    scanning for broadcast identifiers; and
    transmitting a list of broadcast identifiers that are available to a user device for display, wherein the second auditory device has a broadcast identifier that is part of the list of broadcast identifiers.

10. The method of claim 9, wherein the list of broadcast identifiers is based on auditory devices that use one or more settings that are similar to one or more settings for the first auditory device.

11. A user device comprising:
one or more processors; and
logic encoded in one or more non-transitory media for execution by the one or more processors and when executed are operable to:
display a user interface that includes an option for a first auditory device to connect to a second auditory device;
determine that a user selected the option for the first auditory device to connect to the second auditory device;
transmit an instruction to the first auditory device to transmit a request for a first connection to the second auditory device;
receive a first acknowledgement from the first auditory device that the first auditory device formed the first connection with the second auditory device;
receive a notification that a third auditory device requests a second connection with the first auditory device;
determine that the user provides permission to connect to the third auditory device; and
transmit an instruction to the first auditory device to transmit a second acknowledgement to the third auditory device.

12. The user device of claim 11, wherein the logic is further operable to:
generate graphical data for displaying a user interface that includes an option for the first auditory device to associate a name with a broadcast identifier for the first auditory device.

13. The user device of claim 11, wherein the user interface includes an option for adding a broadcast identifier associated with the second auditory device to groups of identifiers from a personal library, wherein the group of identifiers is at least one selected from the group of a friend group, a family group, a neighbor group, a home internet of things, and combinations thereof.

14. The user device of claim 11, wherein the user interface includes an option for adding a broadcast identifier associated with the second auditory device to groups of identifiers from a common library, wherein the group of identifiers is at least one selected from the group of a company group, a work internet of things group, a business group, a public institution group, and combinations thereof.

15. One or more non-transitory computer-readable media carrying program instructions thereon for execution by the one or more processors on a user device and when executed is operable to:
determine that a user requests that a first auditory device connect to a second auditory device;
transmit a request for a first connection to the second auditory device;
responsive to receiving an acknowledgement, subscribe to the first connection;
receive a notification that a third auditory device requests a second connection with the first auditory device;
determine that the user provides permission to connect to the third auditory device;
transmit a second acknowledgement to the third auditory device; and
communicate with the second auditory device until the first auditory device is done or out of a communication range with the second auditory device.

16. The one or more computer-readable media of claim 15, wherein:
determining that the user requests to connect to the second auditory device includes receiving a request from a user device; and
the request is made via a user interface that includes an identifier for the second auditory device.

17. The one or more computer-readable media of claim 16, wherein the second auditory device is associated with a first broadcast identifier and the user interface includes the first broadcast identifier as part of a group of identifiers from a personal library, wherein the group of identifiers is at least one selected from the group of a friend group, a family group, a neighbor group, a home internet of things group, and combinations thereof.

18. The one or more computer-readable media of claim 16, wherein the second auditory device is associated with a first broadcast identifier and the user interface includes the first broadcast identifier as part of a group of identifiers from a common library, wherein the group of identifiers is at least one selected from the group of a company group, a work internet of things group, a business group, a public institution group, and combinations thereof.

19. The one or more computer-readable media of claim 15, wherein the computer-readable media is further operable to:
detect, with a proximity sensor, a gesture or a tap from the user that corresponds to a request to connect to the second auditory device; and
wherein determining that the user requests to connect to the second auditory device is based on detecting the gesture or the tap.

* * * * *